(12) United States Patent
Theis et al.

(10) Patent No.: US 9,903,291 B2
(45) Date of Patent: Feb. 27, 2018

(54) METHOD OF CONTROLLING NOX BY PNA

(71) Applicant: Ford Global Technologies, LLC, Dearborn, MI (US)

(72) Inventors: Joseph Robert Theis, Rockwood, MI (US); Christine Kay Lambert, Dearborn, MI (US); Justin Anthony Ura, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 712 days.

(21) Appl. No.: 14/493,846

(22) Filed: Sep. 23, 2014

(65) Prior Publication Data

US 2016/0084185 A1 Mar. 24, 2016

(51) Int. Cl.

| F01N 3/00 | (2006.01) |
|---|---|
| F02D 41/14 | (2006.01) |
| F01N 13/00 | (2010.01) |
| F01N 3/20 | (2006.01) |
| F02D 41/00 | (2006.01) |
| F02D 41/30 | (2006.01) |
| F02D 41/06 | (2006.01) |
| F02D 41/40 | (2006.01) |

(Continued)

(52) U.S. Cl.
CPC ....... *F02D 41/1462* (2013.01); *F01N 3/2066* (2013.01); *F01N 9/00* (2013.01); *F01N 13/008* (2013.01); *F01N 13/009* (2014.06); *F02D 41/005* (2013.01); *F02D 41/0235* (2013.01); *F02D 41/064* (2013.01); *F02D 41/1461* (2013.01); *F02D 41/1463* (2013.01); *F02D 41/30* (2013.01); *F02D 41/401* (2013.01); *F01N 3/0807* (2013.01); *F01N 3/0842* (2013.01); *F01N 2410/06* (2013.01); *F01N 2610/02* (2013.01); *F01N 2610/1453* (2013.01); *F01N 2900/1402* (2013.01); *F01N 2900/1602* (2013.01); *F01N 2900/1614* (2013.01); *F02D 41/402* (2013.01); *F02D 2200/0802* (2013.01); *F02D 2200/0811* (2013.01); *Y02T 10/24* (2013.01); *Y02T 10/44* (2013.01); *Y02T 10/47* (2013.01)

(58) Field of Classification Search
USPC ......... 60/274, 276, 278, 286, 295, 297, 301, 60/303
See application file for complete search history.

(56) References Cited

U.S. PATENT DOCUMENTS

| 6,182,443 B1 | 2/2001 | Jarvis et al. |
| 6,846,464 B2 | 1/2005 | Montreuil et al. |

(Continued)

FOREIGN PATENT DOCUMENTS

EP 2410144 B1 3/2013

*Primary Examiner* — Binh Q Tran
(74) *Attorney, Agent, or Firm* — Julia Voutyras; McCoy Russell LLP

(57) ABSTRACT

Methods and systems are provided for reducing engine cold-start emissions. An exhaust system having a passive NOx adsorber (PNA) may store NOx during an engine cold-start until conditions are optimal for release of the stored NOx to a downstream SCR catalyst. Based on PNA conditions, including a NOx load and a PNA bed temperature, adjustments to EGR rate and/or injection timing may be made to achieve a catalytically favorable ratio of NOx species upstream of the SCR catalyst, after the SCR catalyst has reached its light-off temperature.

18 Claims, 5 Drawing Sheets

(51) Int. Cl.
*F02D 41/02* (2006.01)
*F01N 9/00* (2006.01)
*F01N 3/08* (2006.01)

(56) References Cited

U.S. PATENT DOCUMENTS

| | | | |
|---|---|---|---|
| 7,059,114 B2 * | 6/2006 | Tang | F01N 3/0842 |
| | | | 123/3 |
| 7,390,469 B2 | 6/2008 | Montreuil et al. | |
| 7,726,118 B2 | 6/2010 | Oberski et al. | |
| 8,407,987 B2 | 4/2013 | Andersson et al. | |
| 8,420,036 B1 | 4/2013 | Miwa | |
| 8,562,924 B1 | 10/2013 | Roberts, Jr. | |
| 8,635,861 B2 | 1/2014 | Sun et al. | |
| 8,745,969 B2 | 6/2014 | Sloane et al. | |
| 9,512,761 B2 * | 12/2016 | Ancimer | F01N 3/2066 |
| 9,551,252 B2 * | 1/2017 | Park | F01N 3/208 |
| 2004/0040289 A1 * | 3/2004 | Mazur | B01D 53/9454 |
| | | | 60/295 |
| 2009/0173064 A1 * | 7/2009 | Ren | F01N 3/0821 |
| | | | 60/299 |
| 2012/0216529 A1 | 8/2012 | Joshi et al. | |
| 2012/0222406 A1 * | 9/2012 | Sakurai | F01N 3/0814 |
| | | | 60/276 |
| 2013/0232958 A1 | 9/2013 | Ancimer et al. | |
| 2014/0190150 A1 * | 7/2014 | Sakurai | F01N 3/085 |
| | | | 60/286 |

* cited by examiner

METHOD OF CONTROLLING NOX BY PNA

FIELD

The invention relates generally to a method for a strategy for controlling engine NOx emissions, and more particularly to a method for monitoring and controlling NOx emissions during cold-starts on diesel vehicles.

BACKGROUND AND SUMMARY

Nitrogen oxides such as NO and NO2, referred to collectively as NOx, are common constituents of emissions in the exhaust gas of diesel engines. The levels of these pollutants are controlled to meet emissions standards by reducing them to nitrogen gas at a selective catalytic reduction catalyst (SCR catalyst) that uses injected urea or ammonia as a reductant. However, due to the prolonged time required to heat up exhaust after-treatment devices and achieve catalytic light-off, such as during cold starts, light acceleration and low speed-load cruises, NOx emissions from engine-out cold starts can contribute a significant fraction of the total NOx emissions.

There are several approaches to address this issue. One example approach shown in U.S. Pat. No. 8,407,987 by Andersson discloses a control method for an exhaust after-treatment system of an engine in which the flow of the components of the exhaust gas are oxidized in an oxidation catalyst, and then reduced in a SCR catalyst. The exhaust flow through the oxidation catalyst is controlled depending on a desired ratio among the exhaust constituents, which is based on a temperature of the SCR catalyst that maximizes selected chemical reactions.

However, the inventors have identified potential issues with such an approach. As an example, while the method of Andersson adjusts a NOx ratio using an oxidative catalyst, the oxidative catalyst does not store NOx. As a result, Andersson relies on the regulation of exhaust flow away from, or over, the oxidative material via valves to control how much NOx is available at the oxidative catalyst at any given time. As such, this configuration may be inefficient during relatively cool operating temperatures in optimally facilitating conversion of NOx. This is due to the inability of the reduction catalyst to reach its light-off temperature before the oxidized exhaust gas contacts the reducing agent. Consequently, the NOx may slip through the SCR catalyst without being chemically converted into N2 and N2O.

The inventors herein have recognized the above issue and identified an approach to at least partly address the issue. In one example approach, a method for controlling NOx levels in the feedgas of an engine having a passive NOx adsorber (PNA) and a SCR catalyst in the exhaust passage is provided. The method comprises: adjusting one of a fuel injection timing and an EGR rate based on the storage on and release of NOx from a passive NOx adsorber (PNA) to maintain a NOx species ratio upstream of an exhaust SCR catalyst in an exhaust after-treatment device. In this way, conversion of NOx into non-polluting forms, such as N2, is facilitated, thereby reducing vehicle emissions.

In one example, an exhaust system may include a PNA positioned in an exhaust passage upstream of a SCR catalyst. During an engine cold-start condition, NOx emitted from the engine, in the form of NO, is stored on the PNA until the PNA reaches a pre-determined temperature above the SCR catalyst light-off temperature. More specifically, after adsorbing NO, the PNA may oxidize the NO such that the primary species is NO2, stored as nitrates, and these nitrates decompose at a temperature above the SCR catalyst light-off temperature to release the NO2 into the exhaust. Based on the amount of NO emitted from the engine, and further based on whether the PNA is storing NOx or releasing NO2, a ratio of NOx species downstream of the PNA and upstream of the SCR catalyst may vary. In particular, based on the loading and release of NOx onto and from the PNA, an amount of NO from the engine may pass through the PNA without being converted to NO2. As elaborated herein with reference to FIG. 3, during conditions when NO2 is being released from the PNA, an EGR rate may be reduced or increased and/or fuel injection timing may be advanced or retarded so as to increase or decrease a concentration of NO downstream of the PNA and upstream of the SCR catalyst. Consequently, by adjusting the EGR rate and/or the fuel injection timing, a selected NOx species ratio may be maintained upstream of the SCR catalyst. The selected ratio may correspond to a specific ratio of NOx species (such as a specific ratio of NO to NO2) that allows for maximal conversion of NOx to N2 by the reductant and SCR catalyst. The adjustment to EGR rate and fuel injection timing may be based on an estimation of NOx stored on and released by the PNA, as determined based on operating condition and exhaust gas measurement output by NOx sensors disposed before and after the PNA. In some embodiments with a single NOx sensor after the PNA (i.e. no pre-PNA NOx sensor), the pre-PNA NOx concentration is estimated from engine conditions, including speed, load, EGR setting, fuel injection timing, etc.

In this way, by adjusting the EGR rate and the fuel injection timing, a pre-determined ratio of NO to NO2 species is achieved upstream of the reductant injector and SCR catalyst and downstream of the PNA. This allows NOx conversion to be improved during engine cold-starts. By storing NO at a PNA and then releasing NO2 from the PNA at a pre-determined temperature above the light-off temperature of a downstream SCR catalyst, a controlled discharge of NOx is enabled. In particular, NOx is discharged from the PNA only when optimal conditions are met to reduce inefficient catalytic conversion of NOx to N2. Thus, it is possible to substantially reduce release of NOx species in vehicle emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
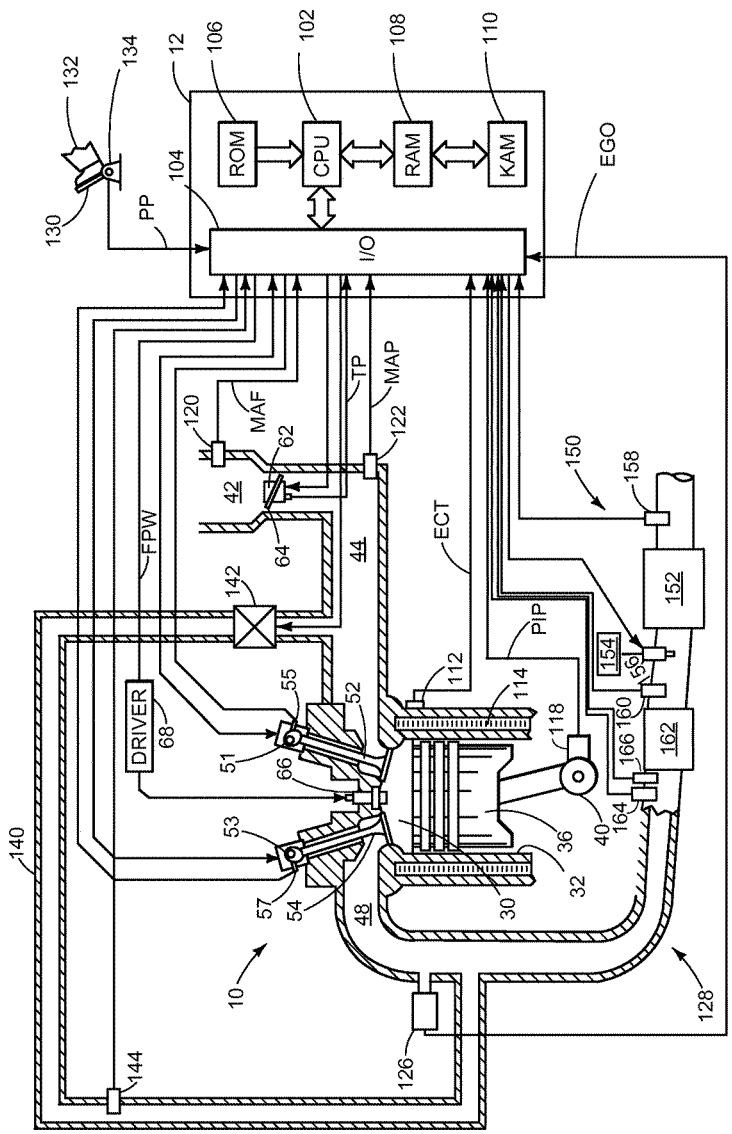
FIG. 1 shows a schematic diagram of an engine.
Figure 2:
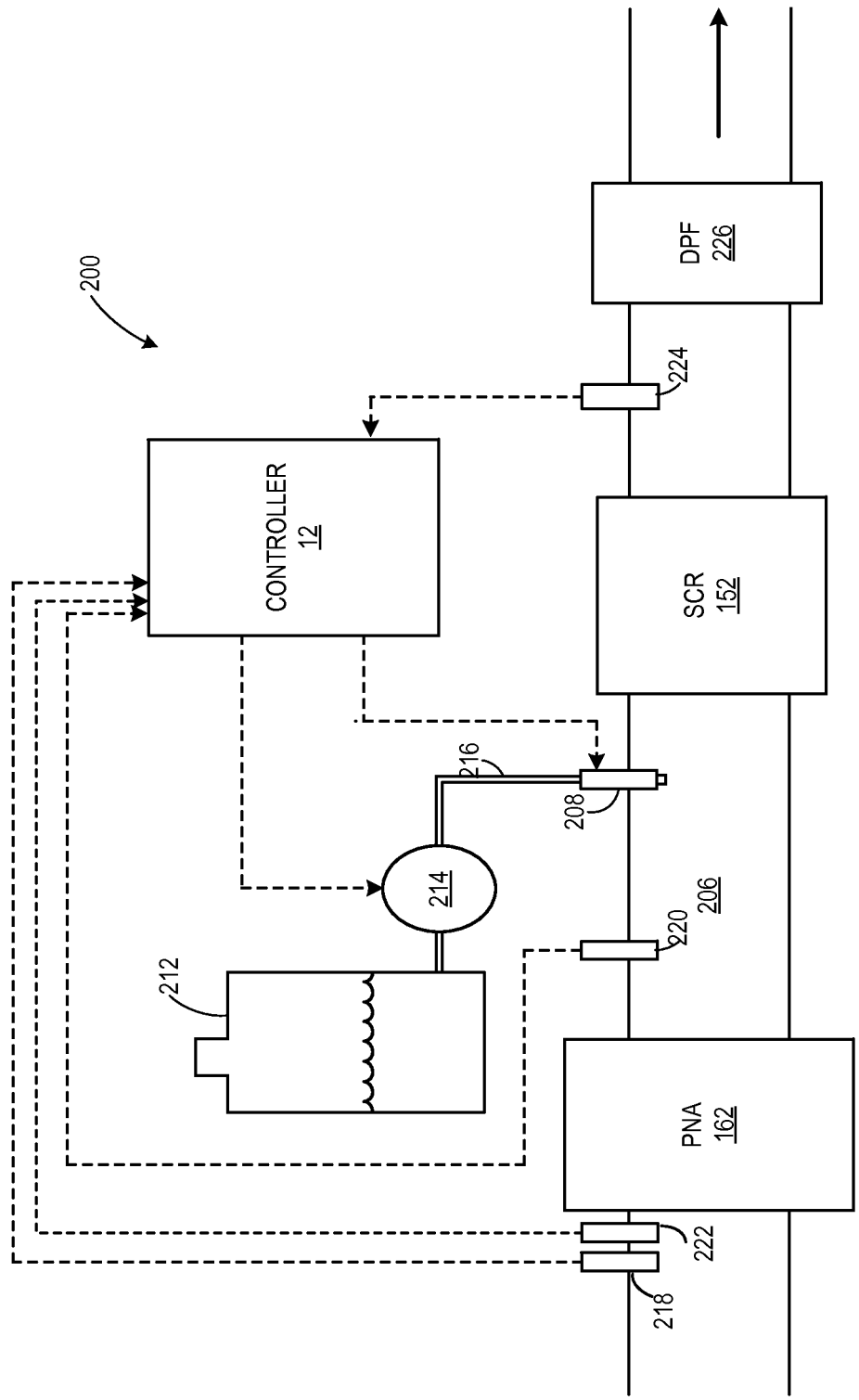
FIG. 2 shows an exhaust aftertreatment system with a PNA and SCR catalyst in an exhaust passage.

The following description relates to methods and systems for controlling NOx levels in the exhaust system of an engine, such as that shown in FIG. 1, via the use of a passive NOx adsorber positioned upstream of an exhaust SCR catalyst, as shown at FIG. 2. A controller may be configured to perform a control routine, such as the routine of FIG. 3, to adjust one of an EGR rate and injection timing during a cold start based on at least one indication of NOx loading and NOx release by the PNA. The controller may also perform a routine, such as the routine of FIG. 4, to evaluate the loading capacity of the PNA and thereby diagnose PNA operation. An example adjustment for NOx control is shown with reference to FIG. 5.

FIG. 1 shows a schematic diagram with one cylinder of multi-cylinder engine 10, which may be included in a propulsion system of a vehicle. Engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber (i.e., cylinder) 30 of the engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to the crankshaft 40 via a flywheel (not shown) to enable a starting operation of the engine 10.

Combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via intake valve 52 and exhaust valve 54 respectively. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. Fuel injector 66 is shown coupled directly to the cylinder 30 for injecting fuel directly therein. Furthermore, fuel injector 66 may be responsive to signals from controller 12 to delay or advance fuel injection timing. It will also be appreciated that the cylinder 30 may receive fuel from a plurality of injections during a combustion cycle.

In one example, the engine 10 may be a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by throttle position signal TP. The intake passage 42 may include a mass air flow sensor 120 and a manifold air pressure sensor 122 for providing respective signals MAF and MAP to the controller 12.

Further, in the disclosed embodiments, an exhaust gas recirculation (EGR) system may route a desired portion of exhaust gas from the exhaust passage 48 to the intake manifold 44 via an EGR passage 140. The amount of EGR provided may be varied by controller 12 via an EGR valve 142 based on engine operating conditions.

The EGR system may include an EGR sensor 144 arranged within the EGR passage 140. The EGR sensor may be configured to provide an indication of one or more of pressure, temperature, and air-fuel ratio of the recirculated exhaust gas. Under some conditions, the EGR system may vary the EGR rate to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

As another example, the EGR rate may be adjusted to increase or decrease the amount of NOx released from cylinder combustion into the exhaust passage 48. As elaborated with reference to FIG. 3, by adjusting the EGR rate, a desired concentration and ratio of NOx species may be maintained in the exhaust passage, upstream of an exhaust SCR catalyst.

Exhaust system 128 may include an exhaust gas sensor 126 coupled to the exhaust passage 48 upstream of an exhaust gas treatment system 150. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), NOx, HC, or CO sensor. The exhaust gas treatment system 150 is shown arranged along the exhaust passage 48 downstream of the exhaust gas sensor 126.

In the example shown in FIG. 1, the exhaust gas treatment system 150 is a selective catalytic reduction (SCR) system. The SCR system includes at least a SCR catalyst 152, a storage reservoir 154 for a reducing agent, such as urea or ammonia, and a reducing agent injector 156. The exhaust gas treatment system 150 may further include a passive NOx adsorber (PNA) 162, which may comprise one or more precious metals, such as Pt. In other embodiments, exhaust gas treatment system 150 may additionally or alternatively include other components, such as a DOC ahead of the PNA, particulate filter downstream of the SCR catalyst or upstream of the PNA, lean NOx trap, three way catalyst, various other emission control devices, or combinations thereof. In the depicted example, the reducing agent injector 156 provides urea or ammonia, for example, from storage reservoir 154. However, various alternative approaches may be used, such as solid urea pellets that generate an ammonia vapor, which is then injected or metered to SCR catalyst 152.

The exhaust gas treatment system 150 further includes a tailpipe exhaust gas sensor 158 positioned downstream of SCR catalyst 152. In the depicted embodiment, exhaust gas sensor 158 may be a NOx sensor, for example, for measuring an amount of post-SCR NOx. Exhaust gas treatment system 150 may further include a feedgas exhaust gas sensor 160 positioned upstream of injector 156 and SCR catalyst 152 and downstream of PNA 162. Further still, a further feedgas exhaust gas sensor 164 may be placed upstream of PNA 162 proximal to the exhaust gas manifold to measure NOx generated from exhaust system 128. In the depicted embodiments, feedgas exhaust gas sensor 164 may be a NOx sensor, for example, for measuring an amount of pre-PNA NOx and exhaust gas sensor 160 may be a NOx sensor for measuring an amount of post-PNA NOx received in the exhaust passage for treatment at SCR catalyst 152.

In some examples, loading of the PNA may be determined based on the output of one or more of exhaust gas sensor 164 located upstream of, and adjacent to PNA 162, and exhaust gas sensor 160 located downstream of, and adjacent to PNA 162. For example, the PNA's NOx loading efficiency or NOx storage efficiency may be determined by comparing NOx levels upstream of the PNA with NOx levels downstream of the PNA via NOx sensors disposed on either end of the PNA. In other embodiments, where a dedicated NOx sensor is not provided upstream of PNA 162, the storage efficiency of the PNA may be based on estimations of the feedgas NOx level based on, among other parameters, the engine speed, load, EGR level, and injection timing. In yet another embodiment, both a dedicated NOx sensor upstream of PNA 162 and estimations of feedgas NOx levels based on operation conditions may be used to estimate storage of the PNA.

Exhaust gas treatment system 150 further includes at least one temperature sensor positioned immediately upstream of, and adjacent to, SCR catalyst 152 to measure the temperature of exhaust gases entering the catalyst. In another embodiment, at least one temperature sensor, such as temperature sensor 166, may be placed just upstream and adjacent to the PNA 162. Controller 12 may, thus, receive a measurement of a temperature of SCR catalyst 152 and/or PNA 162 from one or more temperature sensors.

Controller 12 is shown in FIG. 1 as a microcomputer, including a microprocessor unit 102, input/output ports 104, an electronic storage medium for executable programs and calibration values shown as a read only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal, MAP, from the sensor 122; and exhaust constituent concentration from the exhaust gas sensors 126 and 158. Engine speed signal, RPM, may be generated by controller 12 from signal PIP. Furthermore, controller 12 performs calculations estimating loading of NOx onto PNA 162 based on output from the above sensors, among others, and store said calculations for retrieval at a later point.

The storage medium read-only memory 106 can be programmed with non-transitory, computer readable data representing instructions executable by the processor 102 for performing the methods described below as well as other variants that are anticipated but not specifically listed. Example methods are described herein with reference to FIGS. 3-4.

As described above, FIG. 1 shows only one cylinder of a multi-cylinder engine, and each cylinder may similarly include its own set of intake/exhaust valves, fuel injector, spark plug, etc.

FIG. 2 shows a detailed embodiment of an exhaust gas after-treatment system 200. In one example, exhaust gas after-treatment system 200 may be configured in an engine system, such as the aforementioned exhaust gas treatment system 150 of FIG. 1. As shown, the exhaust gas treatment system 200 includes a first exhaust catalyst, such as a passive NOx adsorber (PNA) 162, and a second exhaust catalyst, such as an SCR catalyst 152. Furthermore, disposed upstream of the PNA may be a diesel oxidation catalyst (DOC). The first exhaust catalyst may be configured as an oxidation catalyst while the second exhaust catalyst is configured as a reduction catalyst. The exhaust gas treatment system 200 further includes a diesel particulate filter (DPF) 226 positioned downstream of each of the PNA 162 and the SCR catalyst 152, along a distal end of exhaust passage 206. In the example of FIG. 2, the second (reduction) catalyst (herein using SCR catalyst 152 as an example) is positioned downstream of the first (oxidation) catalyst (herein using PNA 162 as an example), and upstream of a DPF 226. In an alternate embodiment, the DPF and/or a DOC may be disposed upstream of PNA 162.

The exhaust reductant injector 208 injects a reducing agent (or reductant), such as urea or ammonia, into the exhaust stream responsive to signals received from a controller 12. The released reductant then reacts with exhaust NOx species in the SCR catalyst 152.

In the example depicted in FIG. 2, the exhaust reductant injector 208 is supplied with reductant from a reductant storage reservoir 212. The reductant storage reservoir 212 may be a reservoir suitable for holding the reductant throughout a range of temperatures, for example. The reductant is pumped from the reductant storage reservoir 212 via a pump 214. The pump 214 draws reductant from the reductant storage reservoir 212 and delivers the reductant to the exhaust passage 206 at a higher pressure. As shown, a reductant passage 216 fluidically couples the pump 214 and the reductant injector 208.

The exhaust gas treatment system 200 further includes a plurality of exhaust gas NOx sensors for estimating an amount of NOx at different locations along the exhaust passage. For example, the exhaust gas treatment system 200 may include a first feedgas NOx sensor 218 upstream of PNA 162 (herein referred to as the pre-PNA NOx sensor), and a second feedgas NOx sensor 220 disposed downstream of PNA 162 and upstream of each of reductant injector 208 and SCR catalyst 152 (herein referred to as the post-PNA NOx sensor). As such, NOx sensors are known to detect both NO and NO2 species, as well as NH3. Therefore, the specific positioning of the post-PNA NOx sensor upstream of the reductant injection point reduces cross talk with ammonia from the reductant. The output of exhaust NOx sensors 218 and 220 may provide an estimate of NOx levels in exhaust gas before loading onto the PNA and after release from the PNA upstream of the SCR catalyst under various conditions, such as during an engine cold start. For example, the output of post-PNA NOx sensor 220 may be compared to an output of the pre-PNA NOx sensor 218 to infer PNA loading or PNA release. In one embodiment, if controller 12 receives one or more readings from the post-PNA NOx sensor as being greater than corresponding one or more readings from the pre-PNA NOx sensor, the controller may execute adjustments to engine NOx controls (i.e. EGR rate and/or fuel injection timing) so that pre- and post-PNA NOx sensor readings reach a selected ratio.

Exhaust gas treatment system 200 may further include a third tailpipe NOx sensor 224 disposed downstream of SCR catalyst 152, for providing an estimate of NOx levels in exhaust gas leaving the SCR catalyst. The reductant dosing may be controlled, at least in part, based on the amount of NOx in the exhaust passage 206, as estimated upstream of the SCR catalyst by one or more of NOx sensors 218, 220. The EGR rate may be modulated in order to reduce NOx emissions during cold-start. In particular, by adjusting the EGR rate, a portion of engine NOx may enter the exhaust passage without being oxidized at the PNA, thereby providing a specific ratio of NOx species upstream of the SCR catalyst. For example, EGR rate may be reduced to increase NO emissions from the engine. A portion of the elevated NO may be oxidized to NO2 while a remaining portion may pass through untreated. The resulting mixture released from the PNA may have a selected NOx ratio of NO to NO2 downstream of the PNA and upstream of the SCR catalyst. This specific ratio of NOx species enables optimal chemical reactions and conversion to N2O and N2 at the SCR catalyst.

Figure 3:
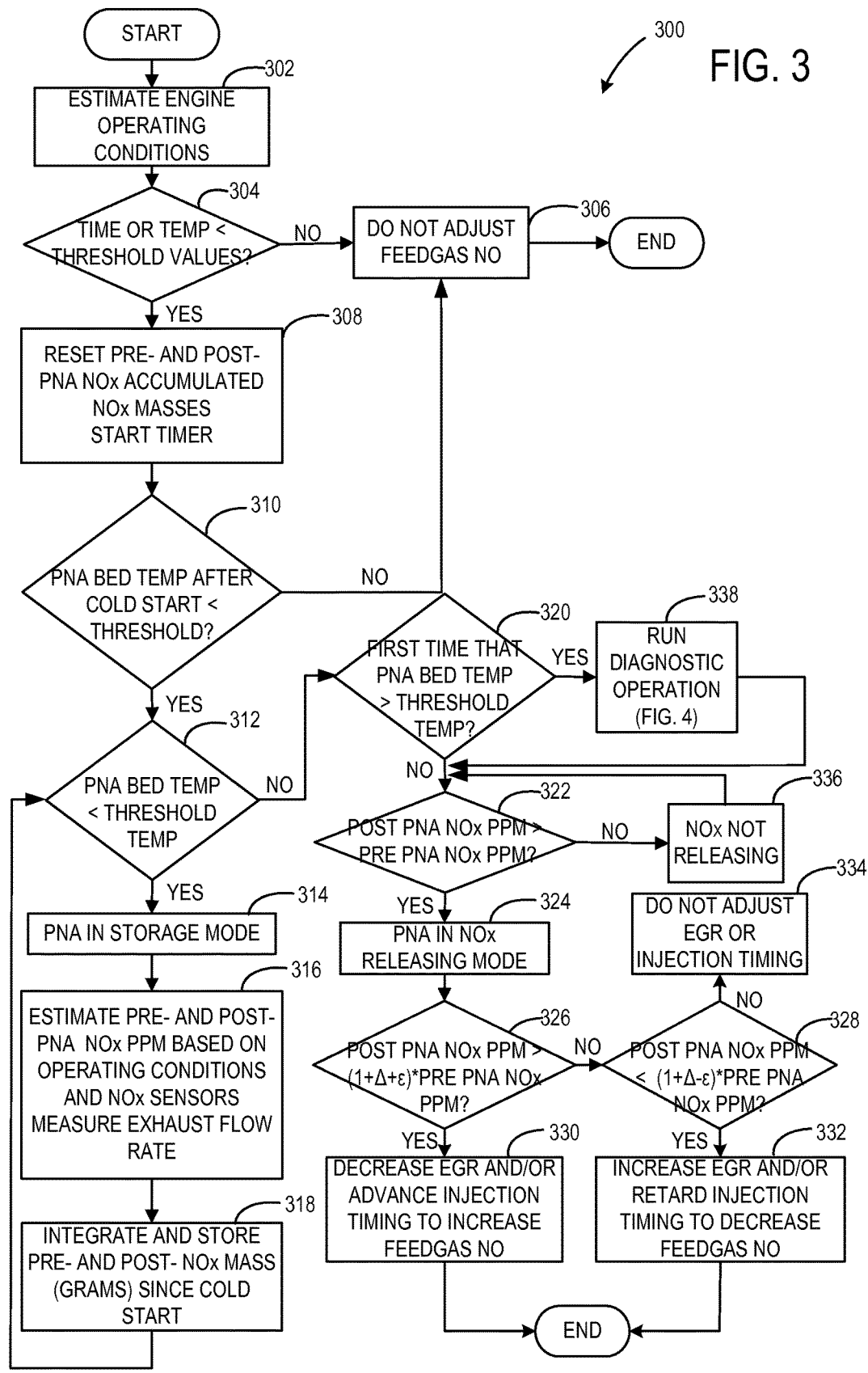
FIG. 3 shows a flow chart for a high level method for controlling NOx levels.

Now turning to FIG. 3, an example routine 300 is shown for controlling NOx levels in an exhaust after-treatment with a PNA and a SCR catalyst responsive to cold start conditions. Specifically, based on the temperature of the PNA bed, the routine determines a mode of operation of the PNA (e.g., storage or release modes) and estimates an amount of NOx loaded onto the PNA based on the determined mode and operating conditions. Using further measurements output by NOx sensors coupled at different locations along the exhaust passage, a total amount of NOx loaded onto the PNA can be accurately estimated. By adjusting the engine-out level of NO while the NOx is being released from the PNA as NO2, a desirable NOx species ratio downstream of the PNA may be achieved. More specifically, depending on one or more parameters, a ratio of NO2 to NO deviating from a desired ratio of 1:1 may be suboptimal for catalytic conversion by the reducing agent over the SCR catalyst. For example, the constituent species of the NOx feedgas received from the exhaust system to exhaust passage comprises primarily of NO upstream of PNA. However, upon contact with PNA, NO may be oxidized into NO2 and stored as nitrates such that the main species of NOx released from PNA may be NO2. In order to achieve a 1:1 ratio of NO:NO2, adjustments to EGR rate and/or injection timing may be executed. By adjusting the ratio of NOx species downstream of the PNA and upstream of the SCR catalyst, a NOx conversion efficiency of the SCR catalyst is improved, reducing vehicle exhaust emissions.

At 302, routine 300 estimates and/or measures engine operating conditions. Estimated operating conditions may include ambient conditions, such as temperature, humidity, and barometric pressure, as well as vehicle operating conditions, such as engine speed and load, engine dilution, engine temperature, exhaust catalyst temperature, boost pressure, fuel level, fuel tank pressure, fuel vapor canister load status, etc. At 304, it may be confirmed if a threshold temperature is met based on one or more outputs of a temperature sensor disposed within the vehicle. Alternatively, a time may be measured and confirmed by a timer set at an initial key-on event. As such, the NOx adjustment routine of FIG. 3 may be selectively performed during desired conditions to reduce NOx slip through an exhaust SCR catalyst. At 304, it is determined if an initial key-on event of a motor vehicle has occurred and if the vehicle is under selected conditions. In one embodiment, selected conditions may be confirmed based on one or more outputs of at least one temperature sensor being less than a temperature threshold representing cold start temperatures (ambient). In an alternate embodiment, the threshold temperature may a temperature above ambient, but below a temperature at which the PNA begins to release stored NOx. In still further examples, selected conditions may be confirmed based on an exhaust catalyst temperature being below a threshold temperature where the catalyst is active (also referred to herein as the catalyst light-off temperature). In another embodiment, a time may be measured by a timer set at an initial key-on event and compared to a pre-determined threshold time. As such, if the measured temperature and/or time are greater than pre-determined threshold values, no control of NOx ratio will occur (306) and routine 300 will end.

If selected conditions are met, the routine will proceed to 308, wherein the integrated amount of NOx mass at the pre-PNA and post-PNA sensor, calculated by integrating the product of the flow rate and the measured NOx concentration from the start of the method, is reset to 0. By resetting the calculated integrated NOx masses, previous data derived from one or more of these NOx sensors may be erased so that subsequent measurements reflect current conditions. As such, this ensures that the subsequent NOx control is performed based on current exhaust NOx concentrations and flow rates and not based on previously existing exhaust NOx concentrations and flow rates.

At 310, it may be confirmed that a first appropriate threshold temperature to proceed is met. Specifically, the output of a temperature sensor coupled at or adjacent to the PNA may be used to determine the bed temperature of the PNA, the bed temperature then compared to a threshold temperature. For example, a pre-determined threshold temperature may refer to a temperature at which the temperature is high enough for both storage and release of NOx to have occurred. In one example, this temperature may be 260° C. If temperature sensor 222 is greater than the threshold temperature, then routine 300 ends. In this way, it is possible to account for situations with different warmup rates.

At 312, another temperature-dependent step is initiated in which a PNA bed temperature may be estimated and compared to a second threshold temperature. Specifically, the output of a temperature sensor coupled at or adjacent to the PNA may be used to determine the bed temperature of the PNA, the bed temperature then compared to a threshold temperature. The threshold temperature may refer to a temperature below which the PNA may be actively adsorbing NOx efficiently (e.g., below 200° C.). In addition, below the threshold temperature, release of NOx from the PNA may be below a minimum pre-specified amount. Based on the estimated bed temperature of the PNA, the controller may determine if the PNA is able to adequately adsorb and prevent release of feedgas NOx in the exhaust passage. In particular, if the bed temperature is below the threshold temperature, it may be determined that the PNA is in a storage mode of operation wherein the PNA is storing (but not yet releasing) NOx. For example with reference to FIG. 2, if the bed temperature of PNA 162, as estimated by temperature sensor 222, is less than 200° C., the conditions for NOx loading onto PNA 162 may be met. However, if the temperature is greater than 200° C., for example, the routine will skip to step 320.

After confirming that the PNA is in a loading or storing mode at step 314, the routine may initiate measurements and estimations of the pre-PNA NOx and the post-PNA NOx amounts based on the output of corresponding NOx sensors. In particular, one or more measurements including a concentration (parts per million, or ppm) of exhaust NOx species upstream and downstream of the PNA may be measured by the pre- and post-PNA NOx sensors, respectively. In another example, the feedgas NOx sensor and/or tailpipe NOx sensor may also be used. The mass of exhaust NOx at the exhaust manifold, and pre-PNA and post-PNA locations may be calculated by integrating a NOx output of the corresponding NOx sensor multiplied by an exhaust flow rate such that these values are measured or estimated and calculated continuously.

In addition, at 316, engine NOx concentration from exhaust system 128 may be estimated based on operating conditions such as, an exhaust flow rate, exhaust air/fuel ratio, exhaust temperature, engine load and speed, etc. For example, measurements of exhaust flow rate will allow for calculations of cumulative NOx before and after the PNA. In another example, during a diesel combustion cold start, the engine may be operated with a lean air/fuel ratio that would enhance NOx production. This, in turn, may affect the PNA's loading capacity and rate of adsorption, as well as the desired NOx species ratio and rate of NOx conversion by the SCR catalyst. At 318, the exhaust NOx emission data estimated based on one or more engine operating conditions may be recorded and stored in a memory of controller 12 in order to accurately estimate the levels of NOx to be loaded and released by the PNA. Upon storage of these measurements, the routine may return to 312. The controller may continue to estimate and update the NOx masses estimated around the PNA (upstream and downstream of the PNA) until the PNA bed temperature exceeds the threshold temperature.

As elaborated below, and with reference to FIG. 4, the amount of exhaust NOx at the PNA estimated when the PNA temperature is less than 200° C. may be used to infer a NOx loading efficiency of the PNA in diagnostic routine 400.

On the other hand, if the PNA bed temperature estimated by the PNA temperature sensor is greater than the second threshold temperature at 312, then routine 300 proceeds to 320. At step 320, it may be determined if the PNA bed temperature has exceeded the threshold temperature for the first time in the given vehicle drive cycle. In one example, the controller may set a flag each time the PNA bed temperature exceeds the threshold temperature, and based on the number of flags that have been set on a given vehicle drive cycle, it may be determined if the PNA bed temperature has exceeded the threshold temperature for the first time. Contingent on whether it is a first time that the PNA temperature measures a PNA bed temperature that is higher than the threshold temperature, a PNA diagnostic routine may be initiated at 338, and elaborated at FIG. 4. Upon completing the diagnostic routine of FIG. 4, the routine may move to 322.

If it is not a first time that the PNA bed temperature is greater than the threshold temperature, diagnostic routine (FIG. 4) is skipped and the routine may proceed to step 322.

At step 322, pre-PNA NOx concentrations may be estimated and compared to post-PNA NOx concentrations. Specifically, the NOx output estimated at the post-PNA NOx sensor and pre-PNA NOx sensor may be determined and compared in order to evaluate whether the PNA is actively releasing NOx. As such, when the PNA bed temperature is above the threshold temperature, the PNA may have transitioned from a storing mode to a releasing mode. In particular, during this condition, the PNA may be releasing a NOx species. The NOx concentration in ppm at the post-PNA NOx sensor may be compensated (e.g., corrected) to ensure the measurement is above a minimum threshold. The compensation accounts for a minimum increase in NOx amount that may be required to enable EGR rate and/or injection timing adjustments to be made. In other words, if the difference is less than the minimum amount, EGR and/or fuel injection timing adjustments may not be reliably used to provide NOx control. As an example, if the output of the post-PNA NOX sensor is less than the output of the pre-PNA NOX sensor multiplied by a factor of 1.05 (wherein 5% is the minimum change above which there is a significant difference that allows for EGR or injection timing adjustments), then NOx is not considered to be releasing from the PNA. If the output from the post-PNA NOX sensor is greater than the output of the pre-PNA NOX sensor multiplied by a factor of 1.05, then the PNA is considered to be releasing NOx at 324.

To further improve the accuracy of assessing NOx levels released by the PNA, at step 326, it may be confirmed that the post-PNA NOx concentration is greater than a pre-PNA NOx value, wherein the post-PNA NOx value is corrected to account for one or more confounding factors. For example, current NOx sensors typically measure about 80% of the NO2. Therefore, different sensitivities in detecting NO and NO2 may be taken into account by including in calculations performed by controller 12 a fraction of NO2 detected by at least one NOx sensor, herein symbolized as Δ and equaling 0.8 in this particular example.

Furthermore, during the release of NO2 from the PNA, to achieve the 1:1 NO:NO2 ratio immediately upstream of the SCR catalyst, the desired ratio of the NOx level measured after the PNA to the NOx level measured before the PNA may be 1.8, since the post-PNA sensor may detect approximately 80% of the NO2. For example, if the pre-PNA NOx is measured to be 200 ppm, then the post-PNA NOx amount that is desired is 400 ppm, or 200 ppm NO and 200 ppm NO2 to achieve a ratio of 1:1 NO:NO2, as previously discussed. However, since the post-PNA sensor only detects 80% of the NOx, the desired concentration measured by the post-PNA NOx sensor is 200+0.8*200 or 360 ppm. If the NOx concentration is above 360 ppm, there may be excess NO2 released from the PNA and the feedgas NO level may be to be increased. If the NOx concentration measured by the post-PNA sensor is less than 360 ppm, then insufficient NO2 is being released from the PNA and the feedgas NO level may be decreased.

Another pre-determined factor may also be included to prevent continuous and dithering corrections of EGR rate and/or fuel injection timing, herein referred to as a ratio tolerance E. In this way, adjustments to the NOx modifying controls (e.g., EGR rate and injection timing) may only occur when a ratio of the NOx sensor readings fall outside a selected band about a pre-determined value. Therefore, at step 326, it may be confirmed if the post-PNA concentration measured by the post-PNA sensor 220 is greater than the pre-PNA NOx ppm*(1.0+Δ+ε), which infers that there is not enough NO present and will initiate procession to step 330. One or more aspects of engine controls (in particular, EGR rate and/or fuel injection timing) may be adjusted to increase the output of NO from exhaust system into exhaust passage in view of an estimated NOx output from the engine based on various operating conditions (step 316) and/or measurements by the pre-PNA NOx sensor. Adjusting the EGR rate and/or fuel injection timing to increase the NO output from the exhaust system at 330 may include decreasing the EGR rate and/or advancing fuel injection timing.

On the other hand, if the post-PNA mass measured by the post-PNA sensor 220 is not greater than that pre-PNA NOx ppm*(1.0+Δ+ε), the routine will proceed to step 328. It may then be further confirmed that the post-PNA sensor 220 is less than the pre-PNA NOx ppm*(1.0+Δ−ε), which infers that there may be excess NO present. If it is confirmed that these conditions are met, then the routine will initiate procession to step 332. At step 332, one or more aspects of engine controls (in particular, EGR rate and/or fuel injection timing) may be adjusted to decrease the output of NO from exhaust system into exhaust passage in view of the estimated NOx output from the engine based on various operating conditions (step 312) and/or measurements by the pre-PNA NOx sensor. Adjusting the EGR rate and/or fuel injection timing to decrease the NO output from the exhaust system at 332 may include increasing the EGR rate and/or retarding fuel injection timing. If the aforementioned parameter is not confirmed, then adjustments to EGR rate and injection timing are not executed and routine 300 exits at step 334.

It will be appreciated that adjustments to EGR rate, fuel injection timing and any combinations thereof, may be carefully controlled at steps 330 and 332 in order to accurately modulate NOx into the exhaust passage upstream of the SCR catalyst. Further, the controller may selectively adjust only the EGR rate during selected conditions to increase or decrease the NO level, while selectively adjusting only the fuel injection timing during other conditions to increase or decrease the NO level. During still other conditions, the controller may use each of an EGR rate adjustment and a fuel injection timing adjustment, while varying a weightage of each adjustment based on PNA conditions. These adjustments and the degree of each adjustment are executed as a function (e.g., a multiplication factor that may be calibrated for a condition) of the difference in a pre-determined ratio and a measured ratio of the post-PNA NOx sensor to the pre-PNA NOx sensor. In one embodiment, the pre-determined ratio of post-PNA NOx ppm to pre-PNA NOx ppm is 1.8. Thus, during selected conditions, the controller may use a larger EGR rate adjustment and a smaller fuel injection timing adjustment to increase or decrease the NO level (at 330, 332) while during other conditions, the controller may use a smaller EGR rate adjustment and a larger fuel injection timing adjustment to increase or decrease the NO level (at 330, 332).

In one example, if the function of the difference of a measured ratio is not significantly greater than 1.8, then EGR rate and/or injection timing may be only modified for a short duration. In another example, if the difference of measured ratio is significantly greater than 1.8, then EGR rate and/or injection timing may be modified for a longer duration in order to considerably alter the NO amount upstream of the SCR catalyst. In some examples, the degree of adjustments may be a function of the degree of deviation from the pre-determined ratio, wherein the more a measured ratio is out of a range of the pre-determined ratio, the greater the adjustment to one of an EGR or injection timing.

In yet another example, when an estimated NOx load of the PNA is higher and a function of the difference of a measured ratio of the post-PNA NOx ppm to pre-PNA NOx ppm is above a pre-determined threshold, the controller may advance fuel injection timing by a larger degree while decreasing EGR rate by a smaller degree to increase NO output. Likewise, during the same conditions, the controller may retard fuel injection timing by a larger degree while increasing EGR rate by a smaller degree to decrease NO output. In one example, adjusting fuel injection timing by a larger degree while adjusting EGR rate by a smaller degree includes only using fuel injection timing adjustments to control exhaust NO levels.

In another example, when an estimated NOx load of the PNA is lower and a function of the difference of a measured ratio of the post-PNA NOx ppm to pre-PNA NOx ppm above the pre-determined threshold, the controller may reduce EGR rate by a larger degree while advancing injection timing by a smaller degree to increase NO output. Likewise, during the same conditions, the controller may increase EGR rate by a larger degree while retarding injection timing by a smaller degree to decrease NO output. In one example, adjusting EGR rate by a larger degree while adjusting injection timing by a smaller degree includes only using EGR rate adjustments to control exhaust NO levels.

In still other examples, based on the PNA conditions and the NOx levels and a function of the difference of a measured ratio of the post-PNA NOx ppm to pre-PNA NOx ppm, the controller may use a first adjustment to raise/lower NO concentrations to a first level, and then use an alternate adjustment to further raise/lower NO concentrations to the desired level. For example, during a first condition, when the PNA bed temperature is higher, the PNA load is higher, and/or the post-PNA NOx concentration is higher, the controller may use EGR adjustments to raise NO levels upstream of the SCR catalyst to a first level, and then use fuel injection timing adjustments to further raise the NO levels upstream of the SCR catalyst from the first level to a desired level where the NO2:NO ratio is brought to a selected ratio, such as 1:1. In an alternate example, during a second condition, when the PNA bed temperature is lower, the PNA load is lower, and/or the post-PNA NO2 concentration is lower, the controller may use fuel injection timing adjustments to lower NO levels upstream of the SCR catalyst to a first level, and then use EGR rate adjustments to further lower the NO levels upstream of the SCR catalyst from the first level to a desired level where the NO2:NO ratio is brought to a selected ratio, such as at 1:1.

Still further examples may include further variations in NOx controlling adjustments. For example, during a first condition, when a bed temperature of a PNA is greater than a threshold temperature and a NOx concentration estimated at a post-PNA sensor is greater than a NOx concentration estimated at a pre-PNA sensor multiplied by 1.8, the controller may decrease EGR rate and/or advance fuel injecting timing to increase the engine-out NO. In this scenario, the controller may preferentially advance fuel injection timing if a higher measurement of NOx is determined by a post-PNA sensor. On the other hand, if a lower reading of NOx by a post-PNA sensor is detected, then EGR rate may be preferentially reduced.

During a second condition, when a bed temperature of the exhaust PNA is greater than the threshold temperature, and the NOx concentration at the post-PNA sensor is less than the NOx concentration at the pre-PNA sensor multiplied by 1.8, the controller may preferentially increase the EGR rate and/or retard fuel injecting timing responsive to conditions, including but not limited to, various operating conditions, pre- and post-PNA sensor outputs and the PNA bed temperature.

In all conditions described above, a NOx ratio upstream of the SCR catalyst and downstream of the PNA is maintained at a selected ratio, such as at 1:1.

These controls may result in the post-PNA NOx concentration of NO2 (released from the PNA) being supplemented and mixed with NO from the engine exhaust. In this particular example, to obtain a 1:1 NO:NO2 ratio, the post-PNA NOx concentration to pre-PNA NOx concentration may be 2 (NO2+NO (post-PNA): NO (pre-PNA)) in order to improve NOx conversion of the SCR catalyst during the cold start period. In one example, if the sensor detects 80% of the NO2 (i.e., $\Delta$=0.8) and $\epsilon$ is set at 5% or 0.05, then the EGR level and/or injection timing may be adjusted only when the ratio is above 1.85 or below 1.75. In another example, the amount of adjustments to injection timing and/or EGR rate may be based upon estimated NOx levels emitted by exhaust system 128, wherein NOx levels may be estimated by operating conditions as described in step 316.

It should be appreciated that the correction values and desired ratios disclosed in the above examples may be specific for a given configuration of the engine exhaust system, certain operating conditions, and/or a given embodiment of the present invention. Therefore variations and modifications of these values may exist for other configurations of the engine exhaust system and alternate embodiments of the invention.

Figure 4:
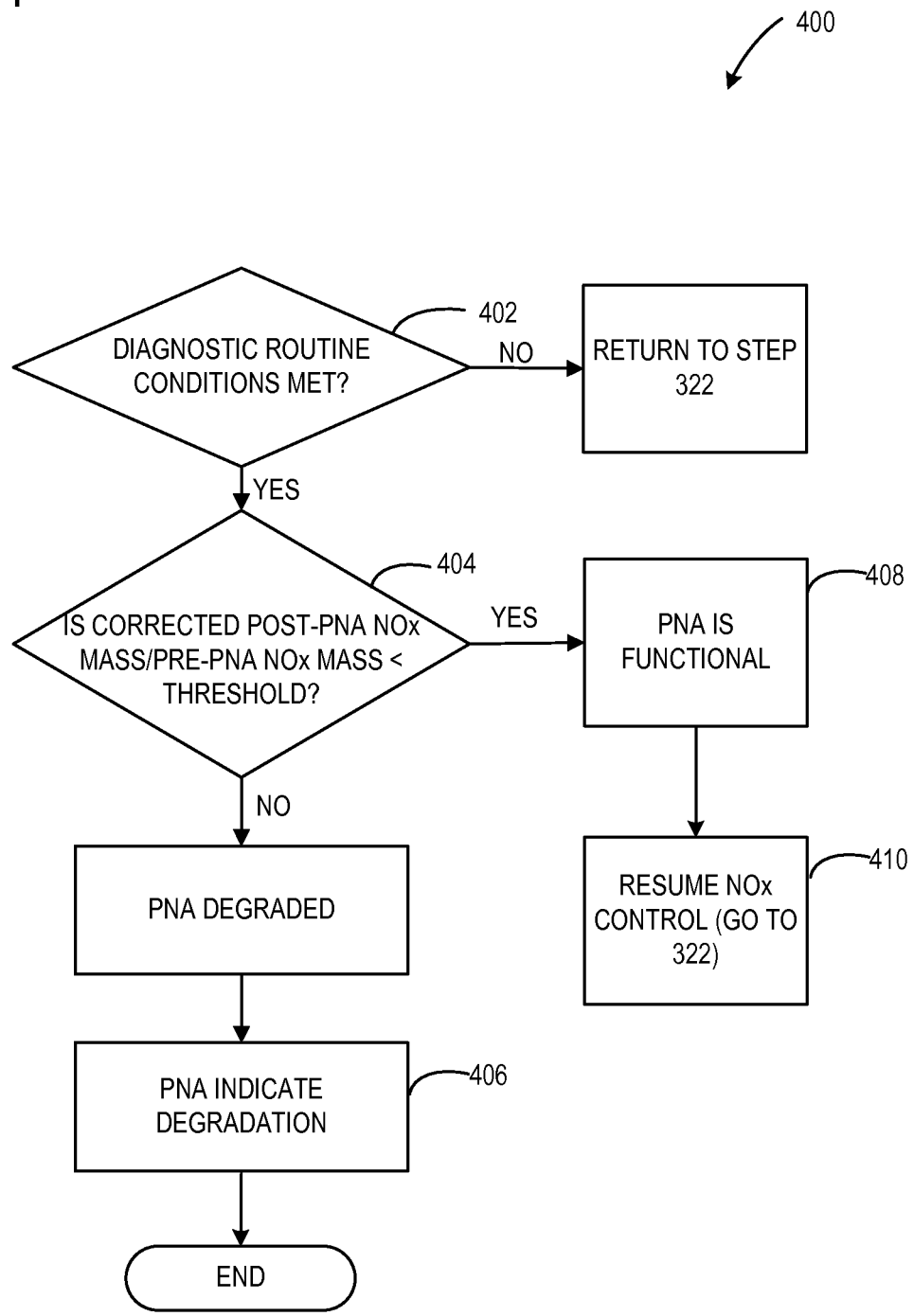
FIG. 4 shows a flow chart for a high level method for diagnosing the NOx storage efficiency of an exhaust PNA.
Figure 5:
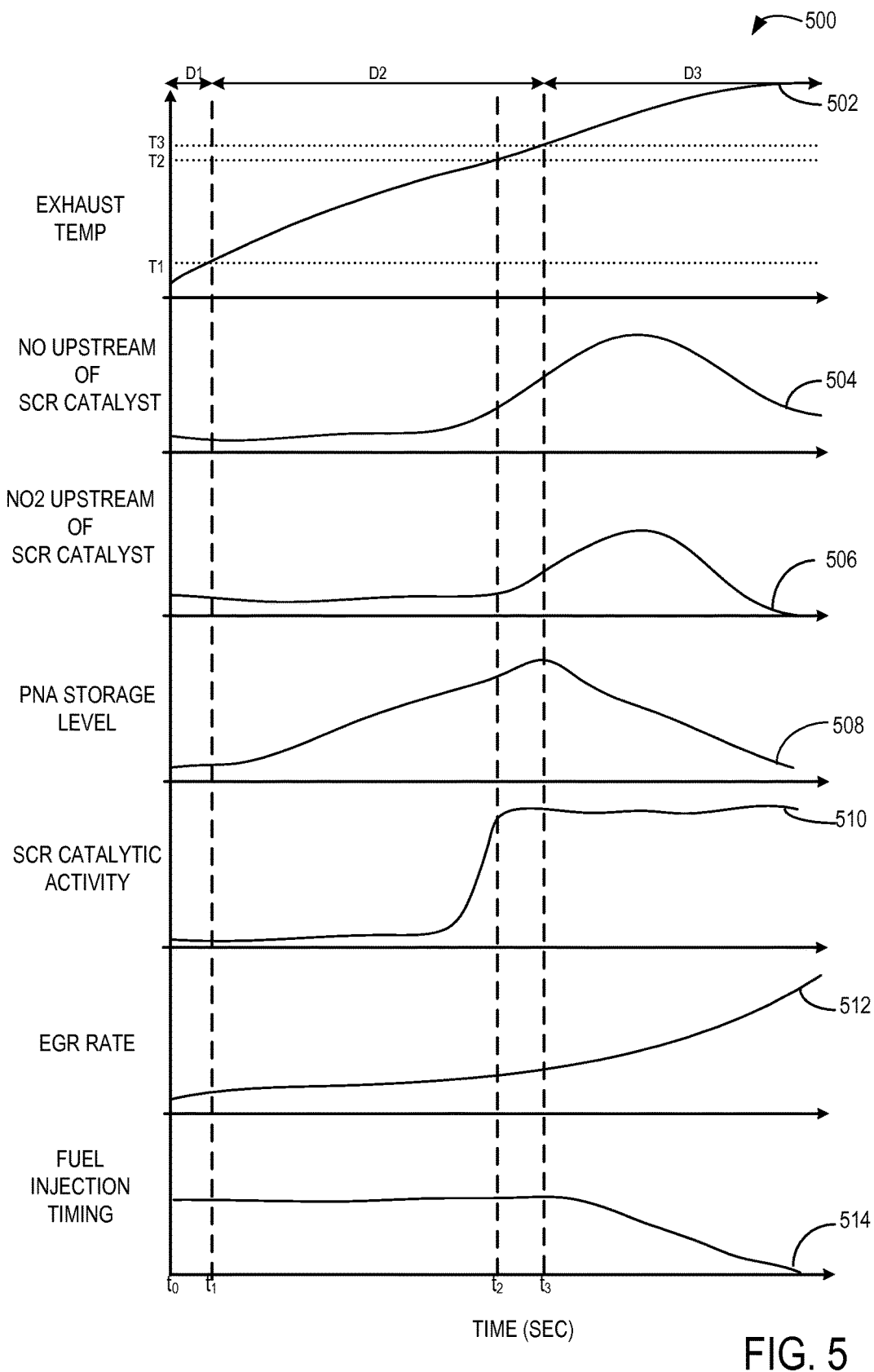
FIG. 5 shows a graph depicting an example adjustment of NOx levels during a cold-start, according to the present disclosure.

FIG. 4 discloses a diagnostic routine 400 that may be executed to evaluate the loading efficiency of the PNA. In one example, the routine of FIG. 4 may be performed as part of the routine of FIG. 3, such as at step 338. Therein, the PNA diagnostic routine may be initiated when the PNA bed temperature exceeds a threshold temperature for a first time. Upon confirming that PNA functionality is not degraded, the routine of FIG. 3 may resume to enable EGR and fuel injection timing adjustments to be used for NOx control and maintenance of a selected ratio of NOx species (e.g., of NO:NO2) at a location downstream of the PNA and upstream of the exhaust SCR catalyst.

At 402, it may be confirmed that conditions for initiating the diagnostic routine have been met. In one example, routine 400 may be initiated if the bed temperature of the exhaust PNA was determined to be greater than a predetermined threshold temperature for a first time on a given vehicle drive cycle, as previously described at step 320 of routine 300. If not, the routine may end.

Upon confirming that diagnostic routine conditions have been met, at 404, the routine may recall measurements pertaining to the release of a mass of NOx emitted by the engine onto PNA from the controller's memory. The measurements may be indicative of PNA NOx loading or storage. In one example, the PNA loading measurements may have been calculated and stored at step 318 of routine 300. Therein the mass of NOx upstream and downstream of the PNA may have been measured by pre- and post-PNA NOx sensors, respectively, while a bed temperature at or adjacent to the PNA was less than a threshold value. At 404, the stored post-PNA NOx mass may be divided by the pre-PNA NOx mass, providing a divided value, to determine PNA degradation, and this value is compared to a threshold value. In one example, during the comparison, the post-PNA NOx sensor reading may be corrected to take into account a minimum NOx loading efficiency value of the PNA, herein referred to as $\delta$. The pre-PNA NOx amount may then be multiplied by a fraction of this value, for example, 1–$\delta$, to obtain a more accurate determination of PNA loading capacity.

In one example, where the divided value is above a threshold value, e.g., 0.5, it may be inferred that NOx is not being properly loaded onto the PNA, and that NOx may be escaping from the PNA and the engine exhaust system before the SCR catalyst is warm enough to convert the NOx. Accordingly, at 406, the routine includes indication degradation of the PNA, such as by illuminating a MIL. The indication of degradation may alternatively include a message displayed to the vehicle operator that engine degradation has been identified, and may further include setting a diagnostic code stored in non-transitory memory corresponding to degradation of the PNA, and specifically identifying the PNA as the component that is degraded. The diagnostic code may be retrievable through an interface port on-board the vehicle. In an alternate example, where the aforementioned divided value is below said threshold value, it may be inferred that NOx is being properly loaded onto the PNA, and that NOx is not escaping from the PNA. Accordingly, at 408, it may be indicated that the PNA is functional (not degraded). The routine may then return to step 322 of routine 300 and resume exhaust NOx control via use of EGR and fuel injection timing adjustments Turning now to FIG. 5, a graphical, prophetic example of controlling exhaust NOx levels in an exhaust gas aftertreatment system, and a ratio of exhaust NOx species downstream of an exhaust PNA and upstream of an exhaust SCR is shown at map 500. The exhaust NOx control is achieved herein using adjustments to an engine EGR rate and/or a fuel injection timing. Map 500 depicts exhaust temperature at plot 502, NO concentration upstream of an SCR catalyst at plot 504, NO2 upstream of an SCR catalyst at plot 506, PNA storage level at plot 508, SCR catalytic activity at plot 510, EGR rate at plot 512, and fuel injection timing at plot 514. All plots are shown over time, along the x-axis.

At t0, an engine restart may be initiated while an exhaust temperature is below a threshold temperature T1. During the restart, NO may be generated from the engine and may slip through the exhaust after-treatment system due to the SCR catalyst being below an SCR catalyst light-off temperature. During a first duration D1, starting at time t0 and bounded ahead by t1, while the exhaust temperature is below T1, the PNA may not be storing NOx. When T1 is reached at t1, the PNA may then be in an active storing mode. During a duration D2, starting at t1 and bounded ahead by t3, adsorption is occurring onto the PNA, and therefore there may be reduced levels of NOx emissions downstream of the PNA. This may be detected by the post-PNA NOx sensor as lower NOx levels compared to the corresponding amounts determined by the pre-PNA NOx sensor. During duration D2, EGR rate and/or injection timing may not be modified.

Before t2, the temperature T2 (e.g. SCR catalyst light-off temperature) may not have been met, so catalytic conversion of the exhaust feedgas may be sub-optimal. When temperature T2 is reached at time t2, catalytic conversion by the SCR catalyst coupled with the reducing activity of the SCR catalyst may enable a more complete NOx conversion into N2.

Upon reaching time t3, the exhaust temperature may rise to a threshold temperature T3, wherein the PNA may transition into a releasing mode. During a second duration D3 (above T3 at a time at or after t3), NOx stored on the PNA may be actively desorbed and released into the exhaust passage upstream of the reductant injector and SCR catalyst. As a result, the post-PNA NOx sensor may start to detect higher levels compared to the amounts detected by the pre-PNA NOx sensor. The released NOx species from the PNA (e.g., NO2) is then mixed with the NO emitted by the engine adjusted by increasing or decreasing the EGR rate and/or retarding or advancing the fuel injection timing to produce a desired NOx species ratio upstream of the reducing agent (e.g., urea or ammonia) on the SCR catalyst. Since temperature T3 is above T2, wherein the SCR catalyst has already lit off, catalytic conversion of NOx to N2 and N2O may be rapid and efficient, and NO and NO2 amounts will quickly fall at similar rates.

The technical effect of adjusting one of an EGR rate and fuel injection timing is the maintenance of a pre-determined ratio of NO to NO2 species upstream of the reductant injector and SCR catalyst and downstream of the PNA. The degree of one or more adjustments are based in part on the loading of the PNA, as determined by engine operating conditions including one or more of a bed temperature of the PNA, a combustion air/fuel ratio, engine dilution, and ignition timing. By adjusting the EGR rate and/or injection timing precisely based on estimated NOx levels adsorbed and released by the PNA, a NOx species ratio may be more accurately modulated upstream of an SCR catalyst and held at a ratio that is optimal for NOx reduction at the SCR catalyst. This allows NOx conversion to be improved, particularly during engine cold-starts. By storing NO at a PNA and then releasing NO2 from the PNA at a pre-determined temperature above the light-off temperature of a downstream SCR catalyst, NOx slip is reduced and more controlled discharge of NOx species is enabled. Overall, vehicle cold start exhaust emissions are improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
with a controller, executing instructions stored in non-transitory memory to:
determine a loading of a passive NOx adsorber (PNA) arranged in an exhaust passage of the engine; and
adjust an engine EGR rate responsive the loading of the PNA to maintain a ratio of a first NOx species to a second NOx species upstream of an SCR catalyst and downstream of the PNA in the exhaust passage substantially at a selected ratio, the adjusting including,
in response to the ratio of the first NOx species relative to the second NOx species exceeding the selected ratio, increasing the EGR rate; and
in response to the ratio of the second NOx species relative to the first NOx species exceeding the selected ratio, decreasing the EGR rate.

2. The method of claim 1, wherein the PNA is loaded with NOx species during an engine cold-start condition, while a temperature of the SCR catalyst is below a light-off temperature.

3. The method of claim 2, wherein the loading of the PNA is based on engine operating conditions including one or more of a bed temperature of the PNA, a combustion air/fuel ratio, engine dilution, and ignition timing.

4. The method of claim 3, wherein the adjusting is performed while the temperature of the SCR catalyst is above the light-off temperature and while the bed temperature of the PNA is above a threshold temperature, the bed temperature of the PNA estimated by a temperature sensor coupled to the PNA.

5. The method of claim 4, wherein the first NOx species is NO, the second NOx species is NO2, and wherein the selected ratio is 1:1 NO:NO2.

6. The method of claim 5, wherein the NOx species ratio is estimated based on outputs of a pre-PNA NOx sensor positioned upstream of the PNA, and a post-PNA NOx sensor positioned downstream of the PNA and upstream of each of the SCR catalyst and an injector delivering reducing agent to the exhaust passage upstream of the SCR catalyst.

7. The method of claim 6, wherein the reducing agent delivered includes one of urea and ammonia.

8. The method of claim 7, wherein the adjusting further includes,
in response to the ratio of the first NOx species relative to the second NOx species exceeding the selected ratio, delaying fuel injection timing; and
in response to the ratio of the second NOx species relative to the first NOx species exceeding the selected ratio, advancing fuel injection timing.

9. The method of claim 6, wherein the adjusting is further based on a NOx detection sensitivity of the pre-PNA and post-PNA NOx sensors and a ratio tolerance.

10. A method for an engine, comprising:
with a controller, executing instructions stored in non-transitory memory to:

during a first condition, only when a bed temperature of a passive NOx adsorber (PNA) arranged in an exhaust passage of the engine is greater than a threshold temperature and a NOx concentration estimated at a post-PNA sensor arranged downstream of the PNA in the exhaust passage is greater than a threshold based on a NOx concentration estimated at a pre-PNA sensor arranged upstream of the PNA in the exhaust passage, decrease an engine EGR rate and advance engine fuel injection timing;

during a second condition, only when a bed temperature of the PNA is greater than the threshold temperature, and the NOx concentration at the post-PNA sensor is less than the threshold, increase the engine EGR rate and delay the engine fuel injection timing; and during both conditions, maintain a NOx ratio downstream of the PNA and upstream of an SCR catalyst, the SCR catalyst arranged in the exhaust passage downstream of the PNA, at a selected ratio.

11. The method of claim 10, wherein the PNA is storing a NOx concentration when the bed temperature of the PNA is lower than the threshold temperature and releasing a NOx concentration when the bed temperature is greater than the threshold temperature.

12. The method of claim 11, wherein the NOx ratio upstream of the SCR catalyst and downstream of the PNA is maintained at a selected ratio that includes a ratio of 1:1.

13. The method of claim 12, wherein the selected NOx ratio is comprised of a ratio of NO to NO2.

14. The method of claim 13, wherein, during the first condition, the engine EGR rate is further decreased and fuel injection timing is further advanced based on higher estimations of a loading of the PNA and, during the second condition, the engine EGR rate is further increased and fuel injection timing is further retarded based on lower estimations of a loading of the PNA.

15. The method of claim 14, wherein during both the first and second conditions, the estimation of a loading of the PNA is based on operating conditions including one or more of a bed temperature of the PNA, a pre-PNA NOx sensor reading, a combustion air/fuel ratio, engine dilution, and ignition timing.

16. An engine system, comprising:
an engine including a fuel injector;
an exhaust passage;
a passive NOx adsorber (PNA) coupled to the exhaust passage;
a temperature sensor coupled to the PNA for estimating a PNA bed temperature;
an SCR catalyst coupled in the exhaust passage downstream of the PNA;
a reductant injector coupled to a urea tank and configured to deliver urea into the exhaust passage upstream of the SCR catalyst;
a first pre-PNA NOx sensor coupled upstream of the PNA;
a second post-PNA sensor coupled downstream of the PNA, and upstream of each of the SCR catalyst and the fuel injector;
an EGR passage configured to recirculate exhaust gas from an engine exhaust to an engine intake; and
a controller with computer readable instructions stored on non-transitory memory for:
during conditions when the PNA is releasing adsorbed NOx,
adjusting a flow rate through the EGR passage based on PNA loading to maintain a ratio of a first NOx species measured or estimated upstream of the PNA relative to a second NOx species measured downstream of the PNA at a selected ratio, the adjusting including,
in response to the ratio of the first NOx species relative to the second NOx species exceeding the selected ratio, increasing the flow rate through the EGR passage; and
in response to the ratio of the second NOx species relative to the first NOx species exceeding the selected ratio, decreasing the flow rate through the EGR passage.

17. The system of claim 16, wherein the controller includes further instructions for:
further adjusting a fuel injection timing based on the PNA loading to maintain a ratio of the first NOx species to the second NOx species estimated downstream of the PNA at a selected ratio.

18. The system of claim 17, wherein the PNA loading is inferred based on the pre-PNA NOx sensor.

* * * * *